March 28, 1967     D. A. CHRISTENSEN ET AL     3,311,430

FACE SEAL

Original Filed Nov. 6, 1961

3,311,430
FACE SEAL

Dan A. Christensen, Woodside, Calif., and John H. Bradfute, Ann Arbor, Mich., assignors to Federal-Mogul Corporation, Detroit, Mich., a corporation of Michigan
Application Dec. 22, 1964, Ser. No. 438,807, which is a division of application Ser. No. 150,276, Nov. 6, 1961, now Patent No. 3,185,488, dated May 25, 1965. Divided and this application Oct. 11, 1965, Ser. No. 498,205

6 Claims. (Cl. 308—187.1)

This application is a division of application Ser. No. 438,807, filed Dec. 22, 1964, which was a division of application Ser. No. 150,276, filed Nov. 6, 1961, now Patent No. 3,185,488. This invention related to improvements in face seals.

Most face seals heretofore known have been complex assemblies of a large number of individual elements. In addition to one or more pairs of sealing faces (each of which may itself be an assembly of several parts), there are usually several springs, a separate bellows to separate the sealed area from the non-sealed area, a separate shaft seal, a separate gasket or other more complicated sealing means for sealing with the bore, and a separate anti-rotation device. This complexity of conventional face seals has increased their cost so much as to preclude their use from many environments where a good seal can only be effected by face seals and also from environments where shaft seals give only marginal performance and face seals are far better. The very number of parts, each individually made, sets a high lower limit to their cost, and the more parts there are the more expensive is their assembly. Moreover, this same complexity is liable to result in addition of tolerances, misassembly, mishandling, and misinstallation, all of which make the seals more prone to failure.

An important object of the present invention is to provide a basically simple type of face seal. In its simplest case, the face seal employs a wall of the machine involved as one end and combines with it a single reinforced molded element that serves as spring, bellows, face, shaft seal, and torque lock. Even the more elaborate forms of the invention, which use additional elements, still result in a substantial reduction in the number and complexity of the parts.

A leading characteristic of the present invention is its use of an elastomeric spring acting largely in shear and partly in compression; moreover, this new spring is integral with and the same element as the bellows. This feature alone greatly simplifies the seal and substantially reduces the number of parts in the whole. It is also possible to use this same element as one of the face elements. Moreover, the elastomeric spring of this invention enables substantially greater deflection than is possible when helical metal springs are used; yet at the same time, the cost of production of these elastomeric springs is substantially less.

The cases of face seals heretofore in use have often been dented when subjected to shock, and their working parts have been worn as they slide or move against other working parts, as a result of vibration. Hence, users have been reluctant to put face seals in environments where they encounter considerable vibration or are liable to shock. The face seals of the present invention are much less sensitive to shock and far less likely to be damaged by vibration. The high hysteresis of elastomeric compositions involved in the seal of this invention tends to damp vibration.

Another important feature of the invention is that it makes it possible to tailor the load deflection curve to the space limitations, force requirements, amoutn of travel required, and other requirements. The seal can easily be adapted to fit into small available spaces while still having a load-deflection curve approaching the ideal of a constant force at all deflections.

In general, the invention comprises a mechanical seal having two relatively rotating faces, means for non-rotatably securing one of the faces to one portion of the sealed cavity and means for applying force to and firmly attaching the other face. The latter-mentioned means includes two circular stiffening members, one being smaller in diameter than the other, there being a constant radial clearance between them, and an elastomeric compound in that radial clearance connecting the stiffening members and so constructed that when the stiffening members are displaced axially relative to each other the elastomer is stressed mainly in shear.

Other objects and advantages of the invention will appear from the following decription of some preferred forms thereof.

Figure 1:
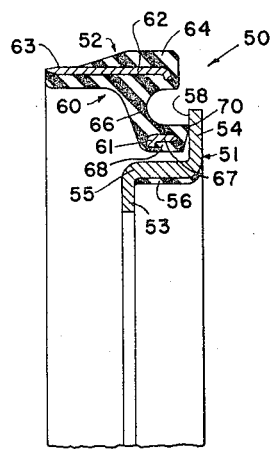
FIG. 1 is a fragmentary view in elevation and in section of part of a face seal embodying the principles of the present invention.
Figure 2:
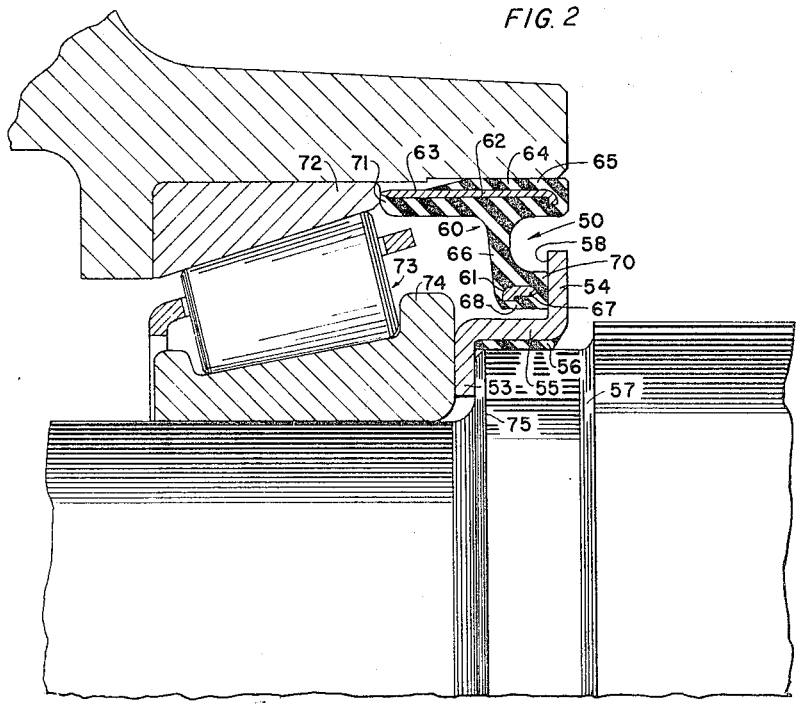
FIG. 2 is a fragmentary view in elevation and in section of an installation incorporating the seal of FIG. 1 in conjunction with a tapered roller bearing.

The seal 50 of FIGS. 1 and 2 is for tapered roller bearings and incorporates two annular sealing elements 51 and 52. The element 51 is a stationary metal member, preferably made from sheet metal, formed in a somewhat S-shape in cross-section having an inner radial portion 53 and an outer radial portion 54 connected together by an axial portion 55. Preferably the axial portion 55 has an elastomeric lining 56 enabling sealed installation upon a shaft 57 (FIG. 2). The outer radial portion 54 provides a sealing face 58.

The other element 52 of the seal 50 comprises a synthetic elastomer body 60 bonded to an inner peripheral reinforcing member 61 and an outer peripheral reinforcing member 62. As a result, the elastomer is stressed in shear by relative axial movement between the two metal rings 21 and 22. Unlike a clamped construction, the elastomer 24 cannot be lifted off the rings 21 and 22 because it is molded to them; therefore, its movement is mainly in shear with some minor amount of compression. Both peripheral members 61 and 62 may be made from sheet metal and are substantially cylindrical. Most of the outer periphery 63 of the outer peripheral member 62 is coated with an elastomeric lining 64, which is tapered from a substantially bare portion of the periphery 63 to a desired thickness for installation in a bore 65. The member 60 has a substantially constant-thickness diaphragm 66 between the two metal members 61 and 62, and the inner periphery 67 of the inner metal member 61 is lined by the elastomer lining 68. A face member 70 is provided adjacent the inner peripheral member 61, its surface lying at an angle to the radial plane.

In the installation of FIG. 2, the outer lining 64 seals against the bore 65, and an inner end 71 seats against an outer race 72 of a tapered roller bearing assembly 73, while the member 51 is mounted on the shaft 57 in between an inner race 74 and a shoulder 75 of the shaft 57. The shaft 57 and the housing 65 thereby exert a pressure on the diaphragm 66 causing it to act mainly in shear and to some degree in compression, and placing the seal under the operating condition shown in FIG. 2. Either the bore 65 or the shaft 57 may be stationary while the other one rotates.

To those skilled in the art to which this invention relates, many additional changes in construction and widely differing embodiments of the invention will suggest themselves without departing from the spirit and scope of the invention as defined in the claims.

What is claimed is:

1. A mechanical seal of the type having first and second relatively continuously rotating faces for use in a sealed cavity having two relatively rotating portions, the combination of:
   said first face being attached to one said portion of said sealed cavity,
   a combination face, spring, and bellows unit comprising
   two separate circular stiffening members of different radii spaced apart by a constant radial clearance, each having cylindrical portions extending a substantial axial distance,
   an elastomeric compound extending across said clearance, and
   means adhesively bonding each of said stiffening members to said compound over a substantial axial distance so that displacement of said stiffening members stresses said compound principally in shear, and said unit having an end wall providing said second rotating face, said stiffening members being embedded in said elastomeric compound so that there is elastomer on both their inner and outer cylindrical peripheries, forming on one said stiffening member a lining for engagement with one of said relatively rotating portions.

2. The seal of claim 1 wherein one of said two relatively rotating portions comprises a shaft having a larger diameter shaft portion and a smaller diameter shaft portion and a radial shoulder joining said shaft portions, and a face member comprising said first face and having a cylindrical shaft engaging portion encircling and engaging said larger diameter shaft portion and having at one end a radially inwardly extending anchoring portion engaging said shoulder and having at its other end a radially outwardly extending portion providing said first face and in rotary sealing engagement with said second face.

3. A face seal component, including in combination:
   inner and outer rigid rings both having generally cylindrical portions extending a substantial axial distance, said rings being generally coaxial with each other and of different radii,
   an elastomeric diaphragm,
   means adhesively bonding said diaphragm to both said rings along a substantial axial length of said cylindrical portion and providing a frusto-conical web directly joining them for spring-like action resulting when said rings are urged in opposite axial directions, the elastomer then being stressed in shear, and
   a radial sealing face adjacent one end of one said ring and backed up by and bonded to said diaphragm, said rings being embedded in the elastomer of said diaphragm so that there is elastomer on both their inner and outer cylindrical peripheries, one said ring thereby having an elastomeric covering for sealing engagement with a cylindrical machine part where said component is installed.

4. A mechanically sealed bearing installation comprising:
   a housing having a cylindrical bore and a shoulder,
   a shaft having a smaller diameter portion, a larger diameter portion and a shoulder joining said portions,
   a first face member comprising a cylindrical portion engaging and sealed to said larger diameter portion and having at one end a radially inwardly extending portion engaging said shoulder and at its other end a radially outwardly extending portion providing a first sealing face,
   an anti-friction bearing having an inner member engaging said smaller diameter portion of said shaft and said radially inwardly extending portion, an outer member engaging said bore and said housing shoulder, and anti-friction means between said inner and outer members, said outer member having an end wall, and
   a second face member having an outer cylindrical metal member, an inner cylindrical metal member, and an elastomeric body joining them to provide a frusto-conical diaphragm acting as a spring and substantially enclosing said metal members to provide a bore-engaging outer elastomeric periphery, said second face member engaging said end wall of said outer bearing member near one end said outer cylindrical metal member, and providing adjacent said inner cylindrical member a second sealing face in rotary sealing engagement with said first sealing face, the engagement of said faces placing said diaphragm in shear.

5. A face seal assembly adapted to fit in the clearance between a bore and a relatively rotatable shaft, comprising:
   a bore-engaging member having a generally radially inwardly extending sealing member with a radial sealing face adjacent a radially inner periphery and
   an annular sheet-metal shaft-engaging member formed and bent to provide an inner radially inwardly extending radial portion at one axial end, an outer radially outwardly extending radial portion at the other axial end, and a cylindrical portion joining said inner portion and said outer portion and fitting snugly on said shaft, said radial portions being in spaced parallel planes,
   said outer radial portion constituting a sealing face lying in a radial plane and engaged by the sealing face of said sealing member.

6. The face seal of claim 5 wherein said cylindrical portion of said shaft-engaging member has an inner peripheral lining of elastomer for engagement with said shaft.

References Cited by the Examiner

UNITED STATES PATENTS

| | | | |
|---|---|---|---|
| 1,916,682 | 7/1933 | Ovestrud | 308—187.1 |
| 2,560,557 | 7/1951 | Curtis | 308—187.1 |
| 2,592,645 | 4/1952 | Kayser | 308—187.1 X |
| 2,845,285 | 7/1958 | Cobb | 308—187.2 X |
| 2,872,219 | 2/1959 | Cobb | 277—95 |
| 2,896,979 | 7/1959 | Stephens | 308—187.2 X |
| 3,010,742 | 11/1961 | Kosatka | 277—95 |

MARTIN P. SCHWADRON, *Primary Examiner.*

DAVID J. WILLIAMOWSKY, *Examiner.*

L. L. JOHNSON, *Assistant Examiner.*